(12) United States Patent
Min et al.

(10) Patent No.: US 12,468,048 B2
(45) Date of Patent: Nov. 11, 2025

(54) POST-PROCESSING OF GLOBAL NAVIGATION SATELLITE SYSTEM (GNSS) DATA

(71) Applicant: Honeywell International Inc., Charlotte, NC (US)

(72) Inventors: Yanling Min, Shanghai (CN); Xiao Cao, Shanghai (CN); Brian Schipper, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 250 days.

(21) Appl. No.: 18/161,615

(22) Filed: Jan. 30, 2023

(65) Prior Publication Data

US 2024/0118435 A1   Apr. 11, 2024

Related U.S. Application Data

(60) Provisional application No. 63/379,105, filed on Oct. 11, 2022.

(51) Int. Cl.
*G01S 19/44* (2010.01)
*G01S 19/37* (2010.01)

(52) U.S. Cl.
CPC .............. *G01S 19/44* (2013.01); *G01S 19/37* (2013.01)

(58) Field of Classification Search
CPC ................................ G01S 19/44; G01S 19/37
USPC .................................................... 342/357.27
See application file for complete search history.

(56) References Cited

U.S. PATENT DOCUMENTS

| | | | |
|---|---|---|---|
| 9,798,017 B2 | 10/2017 | Zhodzishsky et al. | |
| 11,156,722 B2 * | 10/2021 | Dmitrievich | G01S 19/07 |
| 2020/0132860 A1 | 4/2020 | Dmitrievich et al. | |
| 2021/0364655 A1 | 11/2021 | Schipper et al. | |

FOREIGN PATENT DOCUMENTS

| | | |
|---|---|---|
| CN | 110031879 A | 7/2019 |
| CN | 113765571 A | 12/2021 |
| CN | 114675314 B | 8/2022 |
| EP | 3647819 A1 | 5/2020 |

OTHER PUBLICATIONS

European Patent Office, "Extended European Search Report", dated Mar. 4, 2024, from EP Application No. 23197394.2, from Foreign Counterpart to U.S. Appl. No. 18/161,615, pp. 1 through 11, Published: EP.

(Continued)

*Primary Examiner* — Harry K Liu
(74) *Attorney, Agent, or Firm* — Fogg & Powers LLC (57) ABSTRACT

A post-processed GNSS solution from raw GNSS data acquired from a vehicle and optionally other sources is dynamically calculated at the epoch level without using a Kalman filter. Instead, a plurality of GNSS processing methods is applied to each epoch in either the forward or backward direction and the most accurate solution for each epoch of the forward generated solution and backward generated solution is combined. The combined post-processed GNSS solution is determined based on which of the GNSS processing methods were used to generate an epoch of the forward solution and a corresponding epoch of the backward solution.

20 Claims, 7 Drawing Sheets

(56) References Cited

OTHER PUBLICATIONS

Teunissen, "GNSS Integer Ambiguity Validation: Overview of Theory and Methods", Proceedings of The Institute of Navigation Pacific PNT 2013, Honolulu, Hawaii, Apr. 23-25, 2013, pp. 673 through 684.
Zhang et al., "A method of improving ambiguity fixing rate for post-processing kinematic GNSS data", Satellite Navigation, vol. 1, No. 1, Dec. 1, 2020, pp. 1 through 13.
European Patent Office, "Communication pursuant to Article 94(3)EPC", dated Nov. 29, 2024, from EP Application No. 23197394.2, from Foreign Counterpart to U.S. Appl. No. 18/161,615, pp. 1 through 9, Published: EP.
European Patent Office, "Extended European Search Report", dated Sep. 11, 2025, from EP Application No. 23197394.2, from Foreign Counterpart to U.S. Appl. No. 18/161,615, pp. 1 through 12, Published: EP.
Rtklibexplorer: "PPK vs RTK: A look at RTKLIB for post-processing solutions", Aug. 21, 2017, pp. 1 through 8, XP093309159.

\* cited by examiner

POST-PROCESSING OF GLOBAL NAVIGATION SATELLITE SYSTEM (GNSS) DATA

CROSS-REFERENCE TO RELATED APPLICATIONS

This application claims the benefit of U.S. Provisional Application Ser. No. 63/379,105, filed Oct. 11, 2022, and titled "POST-PROCESSING OF GLOBAL NAVIGATION SATELLITE SYSTEM (GNSS) DATA," the contents of which are hereby incorporated herein by reference.

BACKGROUND

GNSS processing techniques use raw GNSS data (signals received from at least one GNSS receiver) to determine a position solution of an object. In some applications of GNSS technology, it is more desirable to perform additional processing of raw GNSS data to get a more precise or accurate position solution. For example, in survey or mapping applications, real-time GNSS position solutions may not be required over a post-processed solution that optimizes the solution accuracy.

Existing post-processing techniques generally utilize forward and backward processing schemes on the raw GNSS data to obtain two distinct position solutions on the same sets of data. Existing post-processing techniques implement Kalman filtering to process forward and backward data. A Kalman filter is based on a system model and assumes that errors in the GNSS data have a normal distribution and are independent. But if the system model is overly complex or inconsistent with the actual state variables, the Kalman filter may exacerbate the existing ambiguities in carrier phase measurements. And for errors that do not conform to the assumed constraints, the Kalman filter states may undervalue the GNSS data and generate a position solution that is deceptively optimistic and not consistent with the true errors in the GNSS data.

Additionally, existing post-processing techniques combine forward and backward solutions by directly combining the two solutions. This gives the advantage of combining data from two correlated solutions to enhance the raw data output and improve the positioning accuracy. However, direct combination does not account for consistency within the forward and/or backward solutions, and ignores solution consistency may degrade the accuracy and/or precision of the combined solution. Also, direct combination ignores the distinctions between solution ambiguities that are important for accurate post-processing.

SUMMARY

The details of one or more embodiments are set forth in the summary and description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

Embodiments of the present disclosure provide techniques for post-processing of GNSS data. Some embodiments generate improved forward or backward position solutions by dynamically applying a plurality of GNSS post-processing methods to each epoch of the GNSS data, thereby generating a forward position solution or backward position solution that maximizes the accuracy of each epoch of the GNSS data. Such embodiments represent an improvement over conventional post-GNSS processing techniques that rely on Kalman filtering to generate forward and backward solutions. Some embodiments generate an improved combined position solution from the forward and backward solutions based on the particular post-processing methods used to generate respective epochs of the forward and backward solutions. These embodiments can generate a more accurate GNSS post-processing solution by determining the consistency between the respective epochs and by combining the forward and backward solutions based on the shared ambiguity values (if any) between the respective epochs. In doing so, the post-processed GNSS solution can be determined with improved accuracy at the epoch level.

Additional exemplary embodiments are described in conjunction with the detailed description below.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described with reference to the detailed description.

In accordance with common practice, the various described features are not drawn to scale but are drawn to emphasize specific features relevant to the exemplary embodiments. As used herein, the term "exemplary" merely indicates the accompanying description is used as an example, rather than implying an ideal, essential, or preferable feature of the invention.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
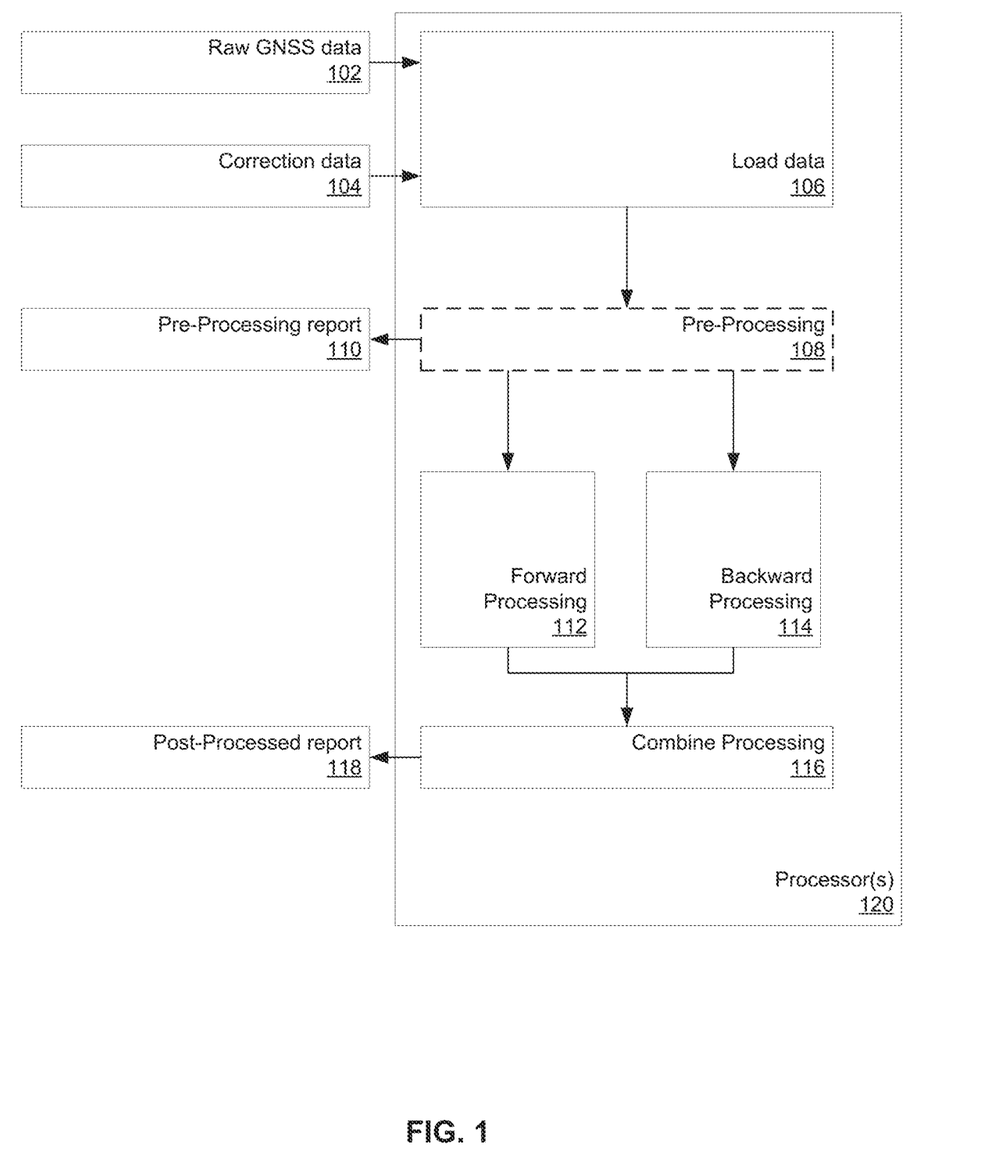
FIG. 1 depicts a diagram illustrating an exemplary method for GNSS post-processing.

FIG. 1 depicts a diagram illustrating an exemplary method for GNSS post-processing. Initially, at least one processor 120 receives a raw GNSS data set 102 from a vehicle. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), urban air mobility vehicles, water traversing vehicles (e.g., ships, submarines), and land traversing vehicles (e.g., automobiles including cars, trucks, motorcycles). Additionally, the raw GNSS data set 102 includes GNSS data from one or more ground systems, such as one or more base stations whose geographic location is known. Processor 120 also receives correction data 104, which can include corrective models (e.g., antenna models), ionospheric data corrections, and other correction sources.

Processor 120 loads the raw GNSS data from the vehicle and ground system(s), as well as the correction data 104 at block 106, and optionally performs a pre-processing algorithm on the loaded data at pre-processing 108. The pre-processing algorithm 108 can include an integrity check process to check the quality of the raw GNSS measurements and to detect and exclude corrupted GNSS measurements. Processor 120 is configured to generate a pre-processing report 110, which can be stored in a memory for later use.

To begin post-processing of the GNSS data, forward and backward processing is performed at blocks 112 and 114, respectively, on the optional pre-processed GNSS data from pre-processing 108 or the unprocessed data 106. To perform forward processing, processor 120 successively processes the GNSS data starting at the first epoch and ending at the last epoch to generate a forward-processed solution (simply referred to as a "forward solution"). To perform backward processing, processor 120 successively processes the GNSS data starting at the last epoch and ending at the first epoch to generate a backward-processed solution (simply referred to as "backward solution"). The forward and backward processing may not yield two identical solutions, even though the raw GNSS data set is the same. For example, the forward processing 112 and backward processing 114 techniques include determining a single point positioning (SPP) solution, a carrier smoothed code differential (CSCD) positioning solution, a wide lane (WL) fixed ambiguity positioning solution, and/or a L1 fixed ambiguity positioning solution for each epoch of the GNSS data.

An SPP method generates a single point position solution at the given epoch based on the raw GNSS data or pre-processed GNSS data. An SPP solution is typically accurate to several meters. A CSCD positioning method compares the GNSS data derived from the vehicle with GNSS data acquired or associated with an independent reference object, such as a base station. In some embodiments, the SPP solution results are optionally used as the initial value for the first iteration of CPSD; however, this is optional since CSCD positioning can be determined based on other initial values instead of the SPP solution results. For example, the initial value input into CSCD can be the previous position of the vehicle (e.g., the position at an earlier epoch) or even zero. Using a closer initial value such as the SPP solution results may yield a CSCD positioning solution that converges to the correct position faster than using less accurate initial values. When generating the CSCD solution, the pseudo-ranges associated with the satellites from the vehicle and the base station can be initially smoothed by their own respective carrier phase during pre-processing. The smoothed pseudo-ranges of the satellites that are common between the vehicle-generated position and the base station-generated position (referred to as "common satellites") are used to calculate the CSCD positioning solution. A CSCD positioning solution typically calculates a position to within a meter.

The results from the CSCD positioning solution, namely the position and variance of the carrier smoothed code differential, can be used to search and determine the ambiguities in WL. WL positioning aims to reduce the number of searchable ambiguities in a GNSS position. WL positioning (and L1 positioning) can be used to determine a position solution in multiple ways. In a searching status mode, a designated searching range is used to filter ambiguity candidates, and a WL position is determined based on eliminating each ambiguity candidate until there is only one candidate remaining. The remaining ambiguity is then fixed, and a fixed ambiguity WL solution is generated with the fixed ambiguity. The searching range can be generated based on the position and variance of the CSCD positioning solution. In a fixed status mode, a fixed ambiguity WL positioning solution is determined based on the fixed integer ambiguities of a previous epoch unless the fixed integer ambiguities are corrupted in the selected epoch (e.g., a cycle slip in the carrier phase is detected that renders the previous integer ambiguities unusable. A fixed ambiguity WL positioning solution (meaning a WL solution whose ambiguities have been fixed) can typically achieve a position with accuracy in 1-2 decimeters.

The results from the fixed WL ambiguity position solution, namely the position and variance, can be used to search and determine the ambiguities in L1. In a searching status mode, a designated searching range is used to filter ambiguity candidates, and a L1 position is determined based on eliminating each ambiguity candidate until there is only one candidate remaining. The remaining ambiguity is then fixed and a fixed ambiguity L1 solution is generated with the fixed ambiguity. The searching range can be generated based on the fixed position and variance of the WL positioning solution, and the ambiguities can be filtered out and fixed based on the double-differential L1 carrier phase measurements. In a fixed status mode, a fixed ambiguity L1 positioning solution is determined based on the fixed integer ambiguities of a previous epoch unless the fixed integer ambiguities are corrupted in the selected epoch (e.g., a cycle slip in the carrier phase is detected that renders the previous integer ambiguities unusable). Fixed L1 positioning, that is, a L1 position solution with fixed ambiguities, typically achieves a position with centimeter level accuracy. Therefore, a combination of SPP, CSCD, WL, and L1 processes will likely produce a GNSS solution with the highest level of accuracy for a given epoch. However, for some epochs, higher level processing may not be able to be used. For example, forward processing on an epoch may only be able to generate a WL solution, whereas forward processing on another epoch may yield an L1 positioning solution.

At block 116, processor 120 combines the results of the forward processing 112 and backward processing 114 for each epoch and generates a combined post-processed GNSS solution. For example, the results of the forward processing 112 and backward processing 114 include status data including the carrier phase ambiguities, pseudo-ranges, the position, the covariance, and other parameters. As part of the combine processing 116, processor 120 determines the position consistency of both the forward processing 112 solution and the backward processing 114 solution. In an embodiment, the position consistency is determined by calculating the difference dr between the forward and backward fixed positions, given by the equation:

$$dr = X_f - X_b$$

where $X_f$ is the position associated with the forward processing 112 and $X_b$ is the position associated with the backward processing. The difference also has an associated variance var(dr), given by the equation:

$$\text{var}(dr) = \text{var}(X_f) + \text{var}(X_b)$$

The position consistency between the forward and backward positions is then determined based on the difference and variance between the two positions. For example, if the magnitude of the difference in position |dr| is sufficiently less than a function of the variance of the difference var(dr), as illustrated in the following equation:

$$|dr| \leq n\sqrt{\text{var}(dr)}$$

(in which n represents any coefficient that can be defined based on the GNSS data and modeling parameters), then the forward-processed solutions and the backward-processed solutions are determined to be consistent and the two solutions pass the consistency check. Depending on whether the two solutions pass the consistency check, the combined post-processed GNSS solution may utilize the results from a higher level processing technique and thereby result in a more accurate solution for a given epoch.

In addition to the consistency check between the forward and backward processed solutions, the combine processing 116 further considers the fixed ambiguity values of the forward and backward processed solutions. For example, even when the two solutions do not pass the consistency check, any satellites with equivalent fixed ambiguities can be used to combine at least parts of the forward and backward processed solutions (referred to as a "partial ambiguity fixed solution") and generate a more accurate post-processed solution than what would be generated by direct and indiscriminate combination of data.

Once processor 120 calculates the combined solution at combine processing 116, processor 120 generates a final post-processed solution including the position and standard deviation for each epoch in a post-processed report 118. The post-processed report 118 can be stored in memory, sent to one or more systems, or used for further processing applications.

Figure 2:
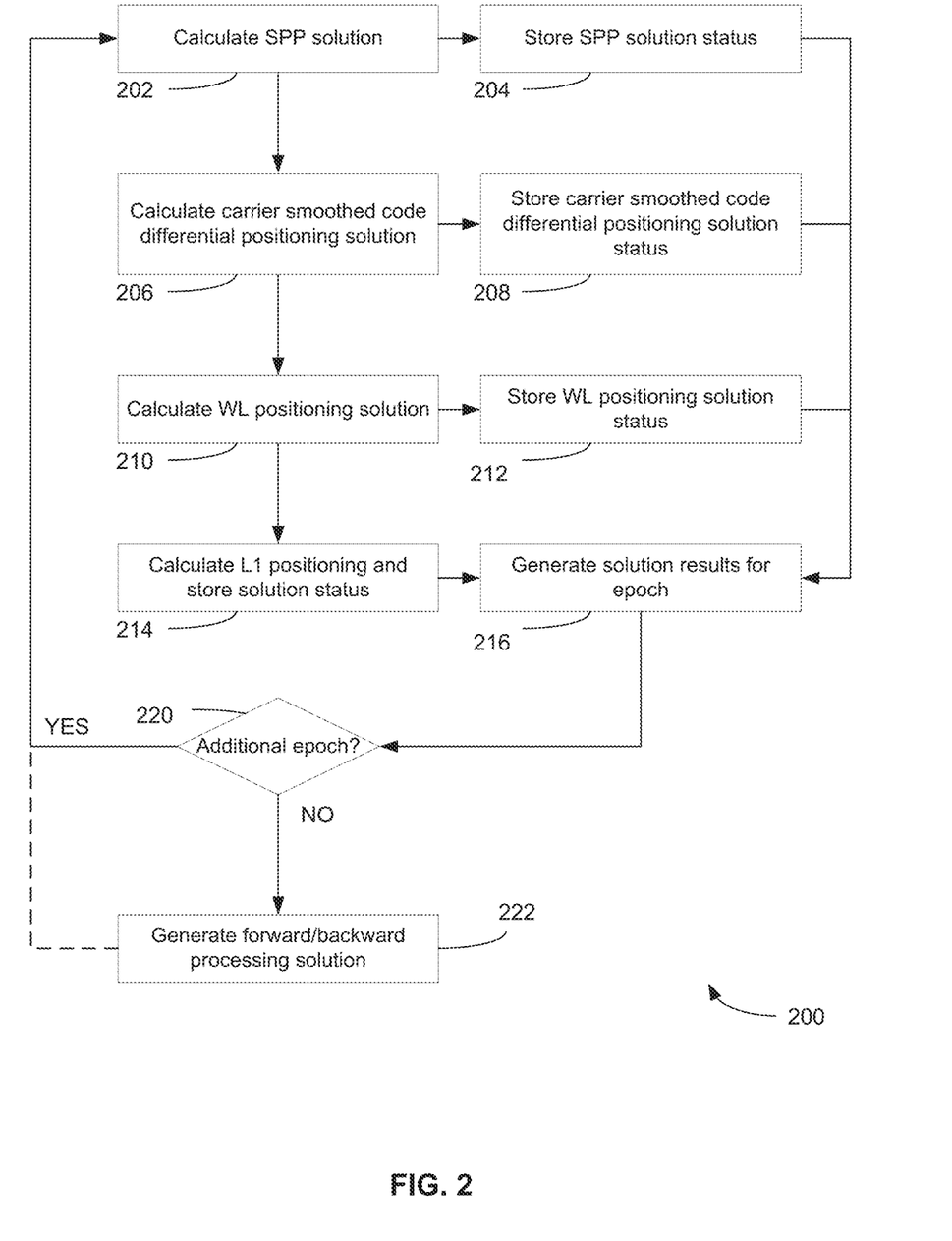
FIG. 2 depicts a flow diagram illustrating an exemplary method for generating forward and backward solutions of a raw GNSS data set.

FIG. 2 depicts a flow diagram illustrating an exemplary method 200 for generating forward and backward solutions of a raw GNSS data set. In some embodiments, method 200 is performed iteratively for each epoch in a raw GNSS data set. To generate a forward solution, method 200 begins at the first epoch and repeats for each later epoch until the last epoch has been processed. To generate a backward solution, method 200 begins at the last epoch and repeats for each earlier epoch until the first epoch has been processed. Method 200 in one embodiment is the forward processing 112 referenced in FIG. 1 when performed in the forward direction, and is the backward processing 114 referenced in FIG. 1 when performed in the backward direction. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 includes calculating a single point positioning (SPP) solution for a selected epoch from the raw GNSS data at block 202. For most epochs, the SPP technique will result in a valid solution, but for some epochs, a position may not be able to be determined based on SPP. This can happen, for example, when the data corresponding to a particular epoch is corrupted and/or unusable. When SPP is successfully completed (that is, it yields a valid solution), then method 200 stores a status indicating that SPP was successfully completed for that epoch. Alternatively, method 200 stores an error message indicating that SPP was not successful if a position could not be determined for the selected epoch.

Method 200 proceeds to block 204 and stores the SPP solution status. Method 200 also proceeds from block 202 to block 206 and calculates a carrier smoothed code differential (CSCD) positioning solution. In some embodiments, method 200 calculates the CSCD positioning solution from the results of the SPP solution. At block 208, method 200 also stores the results of the CSCD positioning solution and the solution status in memory.

Proceeding to block 210, method 200 calculates a WL positioning solution. In some embodiments, method 200 calculates a WL positioning solution based on the results from the CSCD positioning solution generated at block 206. Alternatively, method 200 calculates a WL positioning solution independently of the CSCD positioning solution results. For example, if the WL integer ambiguities are already fixed at a previous epoch, WL fixed solution can be calculated at the selected epoch with the fixed WL integer ambiguities from the previous epoch. Method 200 also stores the status of the WL positioning solution in memory at block 212.

At block 214, method 200 calculates the fixed ambiguity L1 positioning solution for the selected epoch. In one embodiment, method 200 calculates the fixed ambiguity L1 positioning solution based on the WL positioning results generated at block 210. Method 200 also stores the status of the L1 positioning solution in memory at block 216. At block 216, method 200 generates the solution results for the selected epoch. Method 200 analyzes the solution status results from each of the SPP solution (received from block 204), the CSCD solution (received from block 208), WL positioning solution (received from block 216), and the L1 positioning solution (received from block 216) and generates the solution result based on the most accurate solution of the four solution results. For example, in some embodiments a L1 positioning solution cannot be successfully achieved (e.g., because the carrier phase measurements are corrupted at the selected epoch) and a position solution for the selected epoch is determined from the most accurate of the remaining SPP, CSCD, and WL positioning solutions (if each is available).

Generally, the four types of processing are prioritized for a given epoch such that a solution generated by L1 fixed ambiguity positioning is given the highest priority (meaning that the solution is the most accurate), followed by a solution generated by WL fixed ambiguity positioning, followed by a solution generated by CSCD positioning, and a solution generated by SPP positioning having the lowest priority. As described in the context of FIG. 3, generally (though not always the case) the L1 fixed ambiguity positioning solution is given the highest level of priority between the four techniques, while a SPP positioning solution is given the lowest level of priority.

Method 200 then proceeds to block 220 and determines whether there are additional epochs remaining. If there are additional epochs, then method 200 proceeds to block 202 either in a forward direction (to the next subsequent epoch) or in a backward direction (to the next preceding epoch) and repeats the above steps to generate the solution results for the next epoch. However, if there are no additional epochs remaining, then method 200 proceeds to block 222 and generates the forward or backward-processed solution based on the solution results for each epoch from block 216. Method 200 optionally proceeds back to block 202 to generate the remaining forward solution (if the backward solution was generated) or the backward solution (if the forward solution was generated) and repeats the above steps for each epoch accordingly.

Figure 3A:
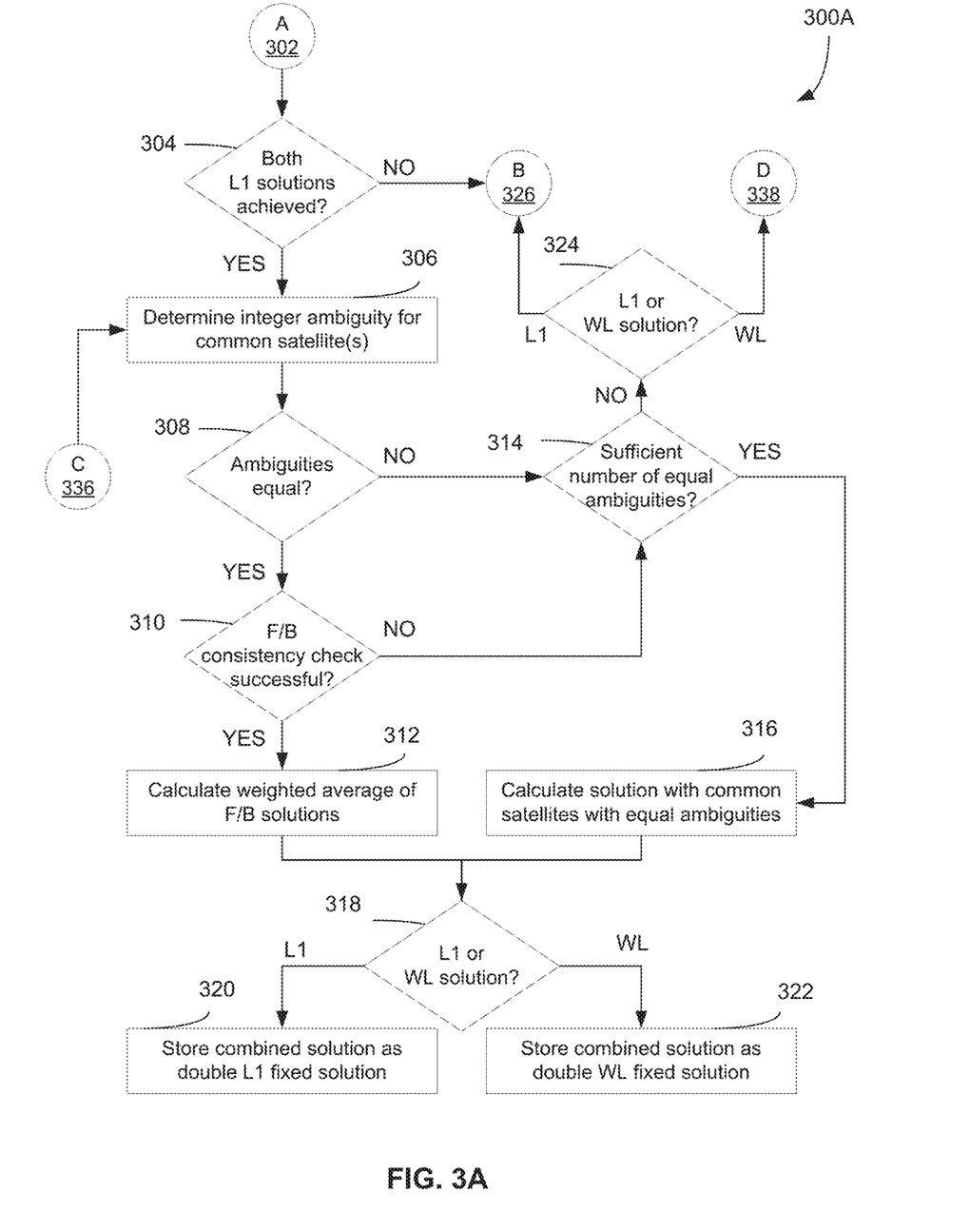
FIGS. 3A-3C depict flow diagrams illustrating exemplary methods for generating a combined GNSS post-processing solution.
Figure 3B:
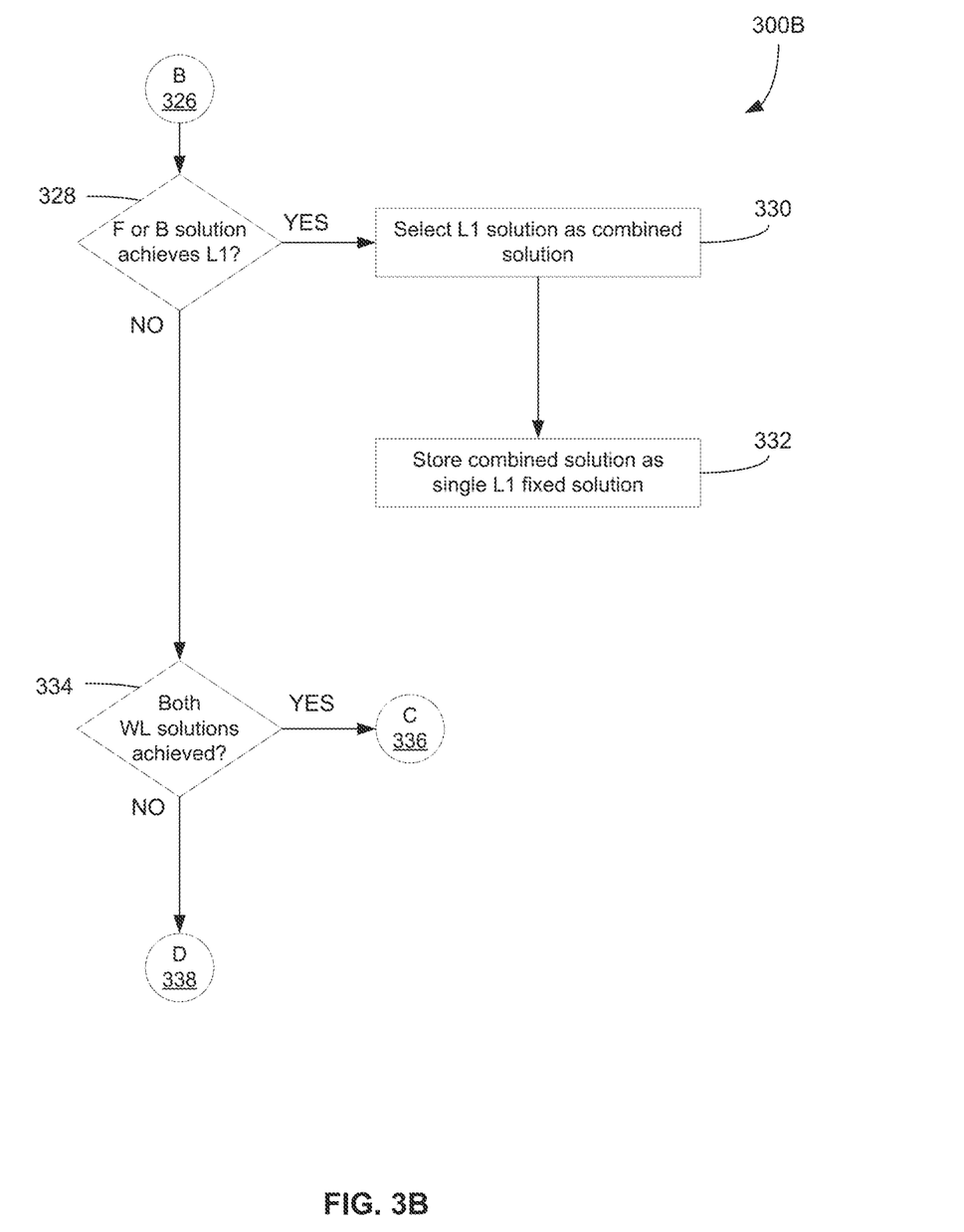
Figure 3C:
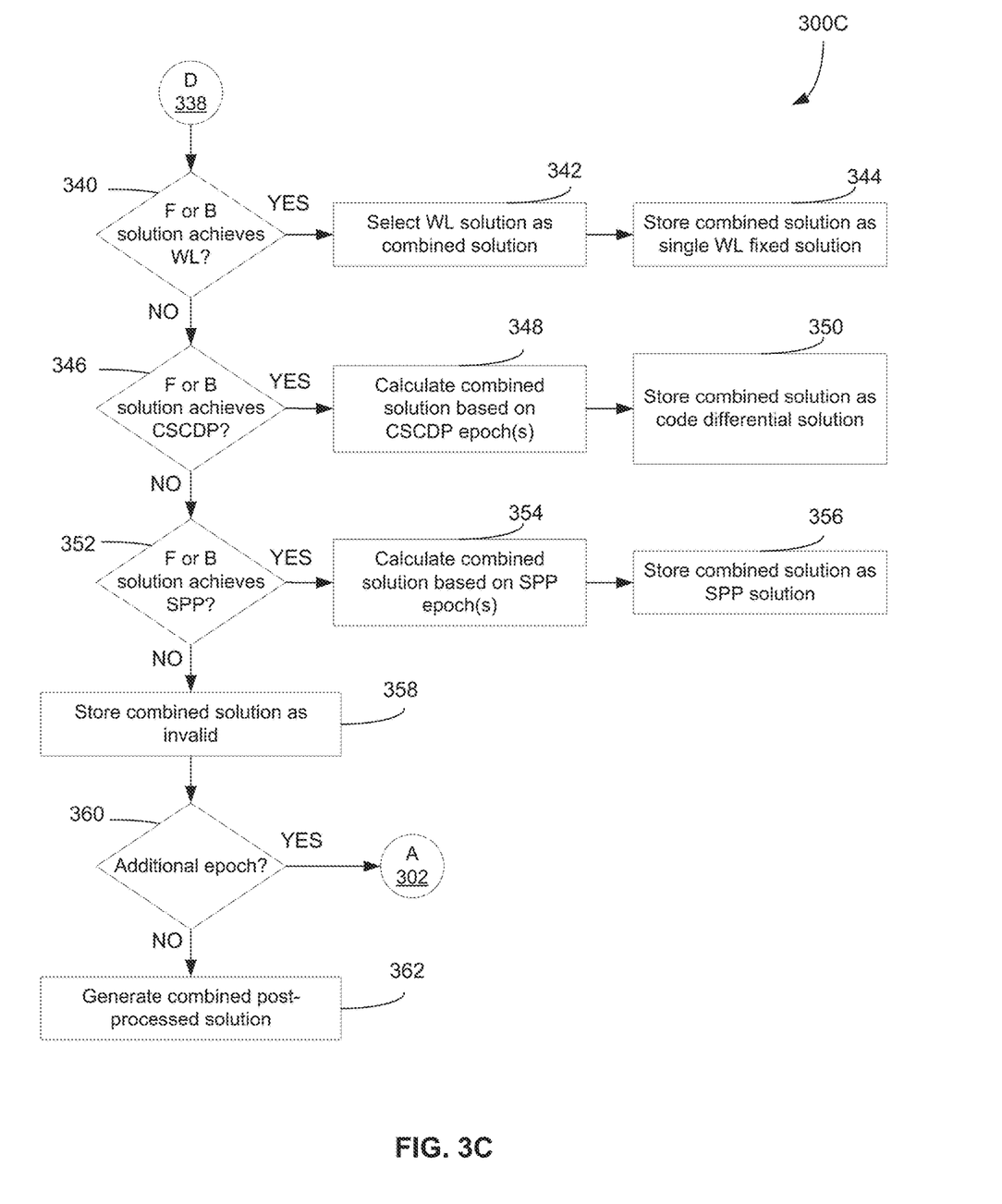

FIGS. 3A-3C depict flow diagrams illustrating exemplary methods for generating a combined GNSS post-processing solution. In some embodiments, methods 300A-300C are performed as part of a single combination processing algorithm. In some embodiments, methods 300A-300C generate a combined post-processed GNSS solution using the forward and backward solutions determined from method 200. For example, methods 300A-300C can be performed in the combine processing 116 of FIG. 1. Similar to method 200, methods 300A-300C are performed iteratively for each selected epoch in the forward and backward solutions, namely between an epoch in the forward solution and a corresponding epoch in the backward solution.

Starting from indicator A 302, method 300A proceeds to block 304 and determines, for the selected epochs, whether both the forward solution and the backward solution achieved successful L1 positioning solutions. If at least one of the forward solution or the backward solution did not successfully extrapolate a position based on L1 positioning, then method 300A proceeds to indicator B 326 into method 300B, to be discussed further. If both epochs did generate successful L1 solutions, then method 300A proceeds to block 306 to determine the integer ambiguity values for the common satellites whose signals are used to generate the forward and backward solutions. Method 300A then proceeds to block 308 and determines whether each of the integer ambiguity values for the common satellites are equal. If there is at least one common satellite with corresponding integer ambiguity values that are not equal between the respective forward and backward epochs, then method 300A continues to block 314 and determines whether there is a sufficient number of common satellites with corresponding integer ambiguity values that are equal. For example, method 300A can determine whether the number of common satellites with common integer ambiguity values exceeds a threshold number of permissible satellites. If there are not enough satellites with common integer ambiguity values, then method 300A proceeds based on whether the forward and backward solutions are L1 positioning solutions or WL positioning solutions for the selected epochs. For L1 positioning solutions, method 300A continues to indicator 326B into method 300B, whereas for WL positioning solutions (to be discussed further), method 300A proceeds to indicator D 338 into method 300C.

Conversely, if there is a sufficient number of common satellites with equal integer ambiguity values between the L1 positioning solutions, then method 300A proceeds from block 314 to block 316 and calculates the combined solution for the selected epochs using the common satellites with equal integer ambiguity values. In one embodiment, method 300A excludes any satellites that are not common between the two L1 positioning solutions and excludes any integer ambiguity values that are not equal between common satellites. Accordingly, method 300A calculates the combined solution with the remaining satellites with equal integer ambiguity values.

Referring back to block 308, in some embodiments, each of the integer ambiguity values for the common satellites are equal. In this case, method 300A proceeds from block 308 to block 310 and determines whether the selected forward and backward epochs pass a consistency check. For example, the consistency between the forward epoch and the backward epoch is verified when the position difference between the forward epoch and the backward epoch is less than a constant multiplied by the standard deviation of the position difference. If the selected forward and backward epochs do not pass the consistency check, then method 300A proceeds from block 310 to block 314 and determines whether there are sufficient number of common satellites with equal integer ambiguity values. The processing from block 314 continues identically as described above for insufficient and sufficient number of common satellites. Assuming that the selected forward and backward epochs pass the consistency check, then method 300A instead proceeds from block 310 to block 312 and determines a combined solution by calculating the weighted average of the selected forward and backward epochs. From block 312 or block 316, method 300A continues to block 318. For a combined L1 positioning solution, method 300A proceeds to block 320 and stores the combined solution for the selected epochs as a double L1 fixed solution.

In some embodiments, method 300A continues to method 300B for the respective forward and backward epochs. For example, method 300A may continue to indicator B 326 when at least one of the forward solution epoch or the backward solution epoch does not successfully obtain an L1 positioning solution. Alternatively, method 300A may continue to method 300B when the selected forward and backward epochs both achieve an L1 positioning solution, but do not have common satellites with equal integer ambiguity values and/or do not pass the consistency check. Starting from indicator B 326, method 300B proceeds to block 328 and determines whether either the forward solution epoch or the backward solution epoch achieves an L1 positioning solution. If so, then method 300B selects the L1 positioning solution as the combined solution at block 330. For example, if the forward solution epoch achieves an L1 positioning solution, but the backward solution epoch does not, then the backward solution is excluded and the forward solution epoch is designated as the "combined" solution between the two selected epochs. Method 330 then stores the combined solution for the selected epochs as a single L1 fixed solution at block 332.

If neither the forward solution and backward solution achieves an L1 positioning solution for the selected epochs, then method 300B proceeds from block 328 to block 334 and determines whether both the forward solution and backward solution successfully achieve a WL positioning solution for the selected epochs. If both epochs do achieve WL positioning, then method 300B proceeds to indicator C 336, which reverts back to method 300A and a similar process is performed as described for L1 positioning but instead in the context of WL positioning. From indicator C 336, method 300A proceeds to block 306 to determine the integer ambiguity values for the common satellites. If, at block 308, each of the common satellites have equal integer ambiguity values, then a consistency check between the WL forward positioning solution and the WL backward positioning solution for the selected epochs. If there are common satellites with unequal integer ambiguity values at block 308, or the forward positioning solution and the WL backward positioning solution does not pass the consistency check for the selected epochs at block 310, then method 300A proceeds to block 314 and determines whether there are sufficient number of common satellites with equal integer ambiguity values for the selected epochs. If there is not a sufficient number of common satellites, then, for a WL positioning solution at block 324, method 300A proceeds to indicator D 338, as discussed further below.

Referring back to block 310, if both the WL forward solution and the WL backward solution passes the consistency check for the selected epochs, then method 300A proceeds to block 312 and determines the combined solution by calculating the weighted average of the WL forward solution and the WL backward solution for the selected epochs. Conversely, from block 314, if there are sufficient number of common satellites with equal integer ambiguity values, then method 300A proceeds to block 316 and determines the combined solution based on the common satellites with equal ambiguity values. From either block 312 or block 316, method 300A proceeds to block 318, and for a WL positioning solution, proceeds to block 322. At block 322, method 300A stores the combined solution for the selected epochs as a double WD fixed solution.

Referring back to block 334 of method 300B, if at least one of the forward solution epoch or the backward solution epoch does not achieve a WL position solution, then method 300B proceeds to indicator D 338 into method 300C. Alternatively, method 300A can proceed to indicator D 338 into method 300C when there are an insufficient number of common satellites with equal integer ambiguity values and the selected epochs achieve a WL positioning solution. From indicator D 338, method 300C proceeds to block 340 and determines whether either the forward position epoch or the backward solution epoch achieves a WL positioning solution. If so, then method 300C proceeds to block 342 and selects the solution that achieves WL positioning as the "combined" solution. For example, if the backward solution achieves WL positioning but the forward solution does not, then the forward solution is excluded and the backward solution is designated as the combined solution for the selected epochs. From block 342, method 300C proceeds to block 344 and stores a combined solution as a single WL fixed solution.

In contrast, if neither the forward solution epoch or the backward solution epoch achieves WL positioning, then method 300C proceeds from block 340 to block 346 and determines whether the forward solution epoch or the backward solution epoch achieves carrier smoothed code differential positioning. If at least one of the forward solution epoch or the backward solution epoch achieves a carrier smoothed code differential positioning solution, then method 300C proceeds from block 346 to block 348 and determines the combined solution based on the solution(s) that achieve CSCD positioning. For example, if both the forward solution epoch and backward solution epoch achieve CSCD positioning, then the combined solution is determined by calculating the weighted average of the forward solution epoch and the backward solution epoch. Alternatively, if only one of the two solutions achieve CSCD positioning, then the solution that achieves CSCD positioning is selected and the other solution is excluded. Then at block 350, method 300C stores the combined solution for the selected epochs as a code differential positioning solution.

In some embodiments, neither the forward solution epoch or the backward solution epoch achieves a carrier smoothed code differential positioning solution. In this case, method 300C proceeds from block 346 to block 352 and determines whether at least one of the forward solution epoch or the backward solution epoch achieves an SPP solution. If at least one of the forward solution epoch or the backward solution epoch achieve and SPP solution, then method 300C proceeds to block 354 and determines the combined solution based on the solution(s) that achieve SPP. For example, if both the forward solution epoch and backward solution epoch achieve SPP, then the combined solution is determined by calculating the weighted average of the forward solution epoch and the backward solution epoch. Alternatively, if only one of the two solutions achieve SPP, then the solution that achieves SPP is selected as the combined solution and the other solution is excluded. From block 354, method 300C proceeds to block 356 and stores the combined solution for the selected epochs as an SPP solution.

If neither of the forward solution epoch or the backward solution epoch achieve SPP, then method 300C proceeds from block 352 to block 358 and stores the combined solution for the selected epochs as an invalid solution.

Once the combined solution for the selected epochs is generated, regardless of whether the combined solution is based on L1, WL, CSCD positioning, or SPP, method 300C proceeds to block 360 and determines whether there are any additional epochs remaining between the forward solution and the backward solution. If there are additional epochs remaining, then an epoch from the forward solution and a corresponding epoch from the backward solution is selected for combination processing, and method 300C proceeds to indicator A 302 to begin the combination processing for the next selected epochs. If there are no epochs remaining, then method 300C proceeds to block 362 to generate the combined post-processed solution based on each of the combined solutions for the selected epochs. In one embodiment, the finalized post-processing solution includes the combined solutions for each of the selected epochs of the forward and backward solutions. The finalized post-processing solution can be stored in memory and used for, e.g., survey, research, or mapping applications.

Figure 4A:
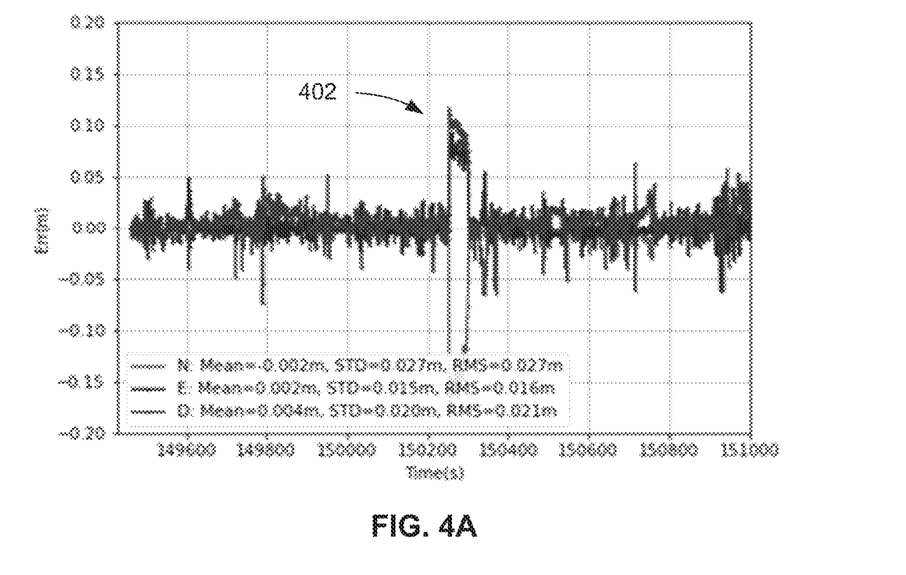
FIGS. 4A-4B depict graphical representations of GNSS post-processing results.
Figure 4B:
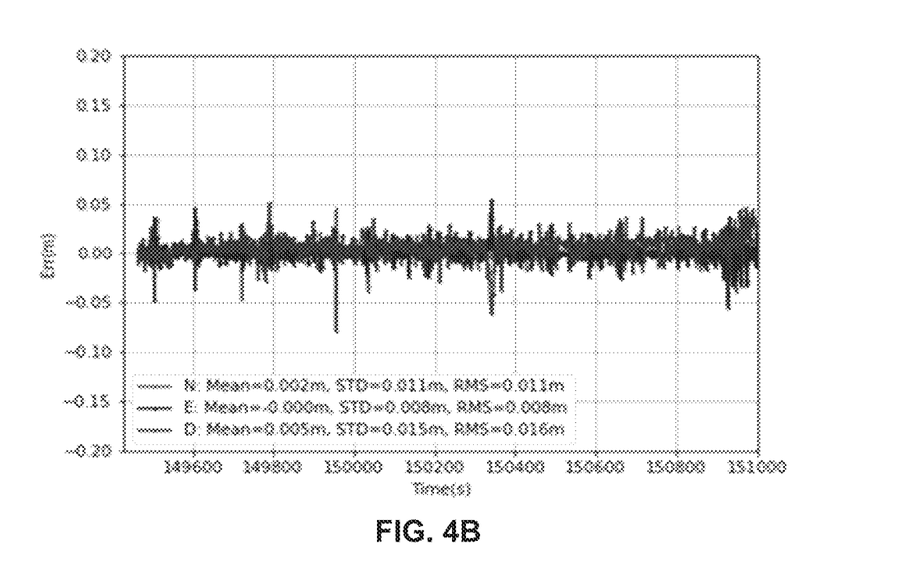

FIGS. 4A-4B depict graphical representations of GNSS post-processing results. Specifically, FIG. 4A depicts a representation of a GNSS post-processed solution using conventional techniques, whereas FIG. 4B depicts a representation of a GNSS post-processed solution based on the techniques described in FIGS. 1-3. Referring to FIG. 4A, the vertical axis represents the error associated with a position calculated at a given time on the horizontal axis with respect to a reference position. Specifically, FIGS. 4A (and 4B) illustrate the error with respect to each 3-dimensional position coordinate in a North-East-Down (NED) coordinate system. An error (y-value) of zero would indicate that the position calculated from the GNSS post-processing solution would perfectly agree with the reference position at the given time.

As shown by peak 402, the conventional post-processing solution calculates a position that noticeably deviates from the reference position, with some coordinates exceeding an error of 0.1 in the time between 150200 seconds and 150400 seconds. In contrast, this deviation is missing from the post-processing solution calculated using the techniques described in FIGS. 1-3. That is, the post-processing solution calculated using the techniques described herein results in a more accurate solution during the time interval between 150200 seconds and 150400 seconds, and an overall improved GNSS solution.

Figure 5:
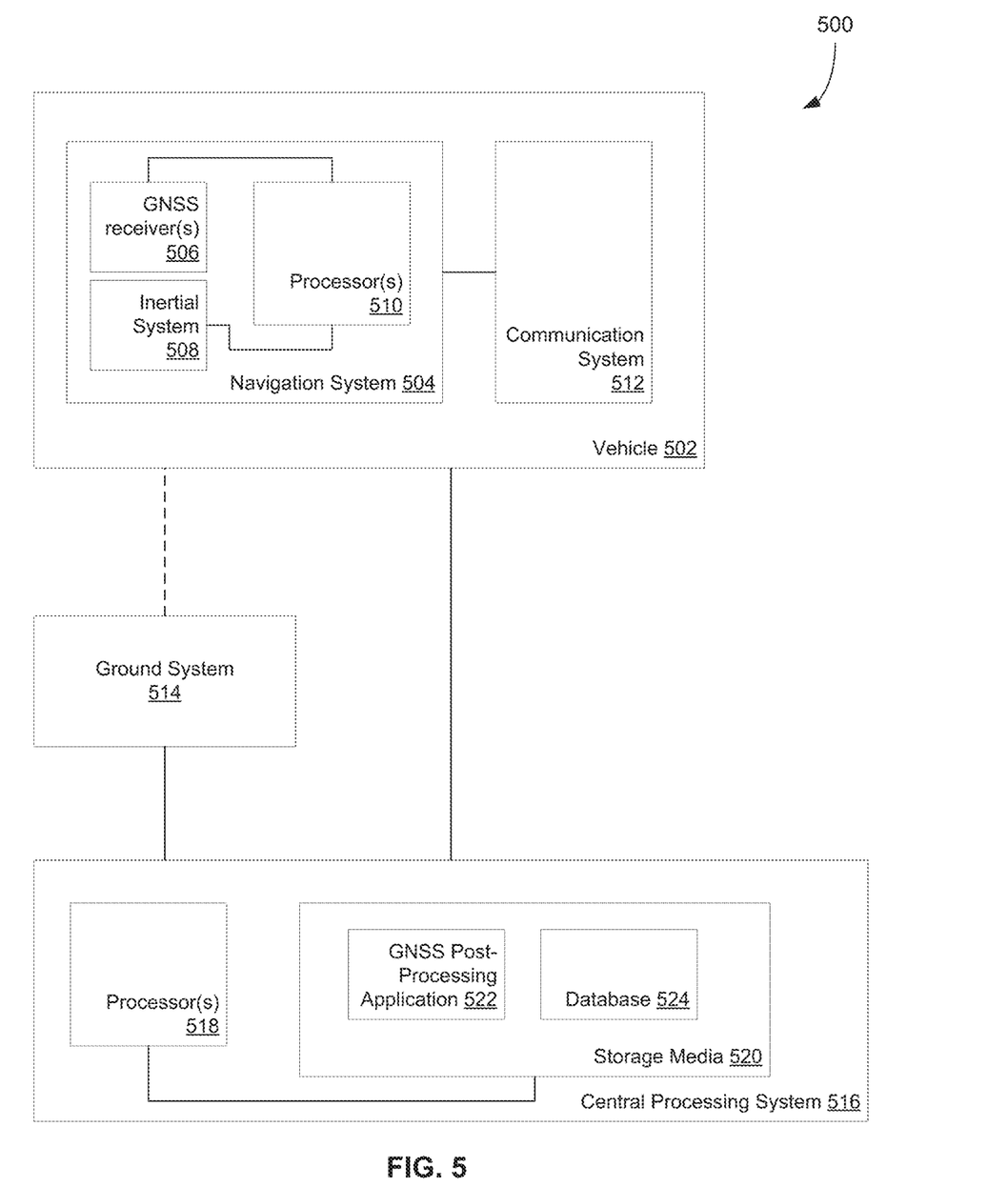
FIG. 5 depicts a block diagram illustrating an exemplary system for generating a GNSS post-processing solution.

FIG. 5 depicts a block diagram illustrating an exemplary system 500 for generating a GNSS post-processing solution. System 500 includes a vehicle 502 (e.g., aerial vehicle) communicatively coupled to a central processing system 516 and optionally to a ground system 514. Among the various operating systems on the vehicle 502 is a navigation system 504 comprising at least one GNSS receiver 506. GNSS receiver 506 is configured to receive GNSS signals from a plurality of satellites in a satellite constellation. In various embodiments, the GNSS is a Global Positioning System (GPS), Galileo, or Beidou satellite system. The vehicle 502 may include multiple GNSS receivers 506, which can be mounted on several places onboard the vehicle.

Processor 510 is configured to receive the GNSS signals from GNSS receiver 506 and determine characteristics of the signals, such as the pseudo-range distance to each satellite, timing information, carrier phase measurements, satellite ephemeris data, and the like. Processor 510 is also configured to calculate the ambiguities associated with the GNSS signal characteristics, such as the position ambiguities for each satellite and the covariance. The GNSS signal characteristics and associated ambiguities constitute the raw GNSS data measurements for the vehicle 502. Vehicle 502 is configured to send the raw GNSS data measurements to central processing system 516 via communication system 512 for post-GNSS processing. However, in some embodiments, processor 510 is configured to perform post-GNSS processing as described in FIGS. 1-4. In this case, vehicle 502 is configured to send the post-processed solution to central processing system 516 for storage in database 524.

In some embodiments, navigation system 504 includes an inertial system 508. The inertial system 508 can be an inertial navigation system (INS) or an inertial reference system (IRS) that comprises inertial sensors and/or processing circuitry. For example, the inertial sensors include gyroscopes, accelerometers, and/or magnetometers configured to determine inertial parameters (e.g., the velocity, acceleration, orientation) of the vehicle 502. Processor 510 is configured to determine the position of the vehicle 502 from the inertial parameters.

Central processing system 516 comprises at least one processor 518 coupled to a storage media 520. The storage media 520 stores a GNSS post-processing application 522 in memory and a database 524 for storing raw GNSS data measurements from vehicle 502, pre-processing data, GNSS data from ground system 514, and post-processed GNSS solutions for a given vehicle 502. GNSS post-processing application 522 comprises instructions for performing the GNSS post-processing techniques described in FIGS. 1-4. Processor 518 is configured to execute the instructions of GNSS post-processing application 522 and generate a finalized post-processed GNSS solution based on the techniques previously described. For example, processor 518 may function identically as processor 120 described in FIG. 1, and may perform any or all of the processing described in FIGS. 3A-3C. After generating a post-processed solution, processor 120 stores the solution in database 524 and optionally sends the post-processed solution to vehicle 502 and/or ground system 514.

In some embodiments, central processing system 516 is implemented on a navigation device for mapping or research. In other embodiments, central processing system 516 is a processing system implemented on a ground station. In other embodiments, the functions of central processing system 516 is implemented on a cloud server connected to multiple vehicles 502 and ground systems 514.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

Example Embodiments

Example 1 includes a method, comprising: receiving GNSS data corresponding to a vehicle, the GNSS data including, for each of a plurality of epochs, pseudorange measurements, carrier phase measurements, and satellite positions for a plurality of satellites; generating a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing; generating, for each corresponding epoch pair between the forward position solution and the backward position solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and generating a post-processed GNSS solution including the combined position solution generated for each corresponding epoch pair.

Example 2 includes the method of Example 1, wherein the types of processing are prioritized such that a position generated from a L1 fixed ambiguity positioning processing is given a highest priority for a respective epoch and a SPP processing is given a lowest priority for the respective epoch; and further comprising: determining, for at least one corresponding epoch pair, that a first type of processing used to generate a final position solution of a first epoch in the at least one corresponding epoch pair is higher in priority than a second type of processing used to generate a final position solution for a second epoch in the at least one corresponding epoch pair; and generating, for the at least one corresponding epoch pair, a combined position solution based on the first epoch associated with the first type of processing having the higher priority.

Example 3 includes the method of any of Examples 1-2, further comprising: determining, for at least one corresponding epoch pair, that a first type of processing used to generate a final position solution of a first epoch in the at least one corresponding epoch pair is equivalent to a second type of processing used to generate a final position solution for a second epoch in the at least one corresponding epoch pair; comparing whether a first set of integer ambiguities associated with the final position solution of the first epoch are equal to a second set of integer ambiguities associated with the final position solution of the second epoch; and generating a combined position solution for the at least one corresponding epoch pair, wherein the generated combined position solution for the at least one corresponding epoch pair is based on whether the first set of integer ambiguities and the second set of integer ambiguities are equal.

Example 4 includes the method of Example 3, further comprising: determining that the first set of integer ambiguities and the second set of integer ambiguities are equal; determining whether the final position solution of the first epoch and the final position solution of the second epoch pass a consistency check; and wherein the generated combined position solution is based on whether the final position solution of the first epoch and the final position solution of the second epoch pass the consistency check.

Example 5 includes the method of Example 4, further comprising: determining either (1) that the first set of integer ambiguities and the second set of integer ambiguities are not equal, and/or (2) that the final position solution of the first epoch and the final position solution of the second epoch do not pass the consistency check; determining whether an amount of equal ambiguities between the first set of integer ambiguities and the second set of integer ambiguities exceed a threshold value; and wherein the generated combined position solution is based on whether the amount of equal ambiguities between the first set of integer ambiguities and the second set of integer ambiguities exceeds the threshold value.

Example 6 includes the method of Example 5, further comprising: determining that the amount of equal ambiguities between the first set of integer ambiguities and the second set of integer ambiguities exceeds the threshold value; and generating the combined position solution for the at least one corresponding epoch pair based on GNSS data associated with satellites that are common to the equal ambiguities between the first set of integer ambiguities and the second set of integer ambiguities.

Example 7 includes the method of any of Examples 5-6, further comprising: determining that the amount of equal ambiguities between the first set of integer ambiguities and the second set of integer ambiguities does not exceed the threshold value; in response to determining that the amount of equal ambiguities does not exceed the threshold value; then comparing a position solution generated by a lower-priority type of processing than the first type of processing of the first epoch of the at least one corresponding epoch pair with a position solution generated by a lower-priority type of processing than the second type of processing of the second epoch of the at least one corresponding epoch pair.

Example 8 includes the method of Example 7, wherein the first type of processing is the L1 fixed ambiguity positioning processing, wherein the lower-priority type of processing is the WL fixed ambiguity positioning processing.

Example 9 includes the method of any of Examples 1-8, further comprising: determining that a position solution generated from L1 fixed ambiguity positioning processing and a position solution generated from WL fixed positioning processing are not valid for a first epoch of at least one corresponding epoch pair; determining that a position solution generated from L1 fixed ambiguity positioning processing and a position solution generated from WL fixed positioning processing are not valid for a second epoch of the at least one corresponding epoch pair; determining that at least one position solution generated from CSCD processing is valid for at least one of: the first epoch or the second epoch; and generating a combined position solution for the at least one corresponding epoch pair based on the at least one position solution generated from CSCD processing.

Example 10 includes the method of any of Examples 1-9, further comprising: determining that a position solution generated from L1 fixed ambiguity positioning processing, WL fixed ambiguity positioning processing, and a position solution generated from CSCD processing are not valid for a first epoch of at least one corresponding epoch pair; determining that a position solution generated from L1 fixed ambiguity positioning processing, WL fixed ambiguity positioning processing, and a position solution generated from CSCD processing are not valid for a second epoch of the at least one corresponding epoch pair; determining that at least one position solution generated from SPP processing is valid for at least one of: the first epoch or the second epoch; and generating a combined position solution for the at least one corresponding epoch pair based on the at least one position solution generated from SPP processing.

Example 11 includes the method of any of Examples 1-10, wherein generating the combined position solution comprises calculating a weighted average of a position solution of a first epoch of at least one corresponding epoch pair and a position solution of a second epoch of the at least one corresponding epoch pair.

Example 12 includes a system, comprising: at least one Global Navigation Satellite Systems (GNSS) receiver, wherein the at least one GNSS receiver is configured to generate GNSS data, the GNSS data including, for each of a plurality of epochs, pseudorange measurements, carrier phase measurements, and satellite positions for a plurality of satellites; at least one processor communicatively coupled to the at least one GNSS receiver; a storage medium coupled to the at least one processor and comprising a GNSS post-processing application, wherein by executing the GNSS post-processing application, the at least one processor is configured to: generate a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing; generate, for each corresponding epoch pair between the forward position solution and the backward position solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and generate a post-processed GNSS solution including the combined position solution generated for each corresponding epoch pair.

Example 13 includes the system of Example 12, wherein the types of processing are prioritized such that a position generated from a L1 fixed ambiguity positioning processing is given a highest priority for a respective epoch and a SPP processing is given a lowest priority for the respective epoch; wherein the at least one processor is configured to: determine, for at least one corresponding epoch pair, that a first type of processing used to generate a final position solution of a first epoch in the at least one corresponding epoch pair is higher in priority than a second type of processing used to generate a final position solution for a second epoch in the at least one corresponding epoch pair; and generate, for the at least one corresponding epoch pair, a combined position solution based on the first epoch associated with the first type of processing having the higher priority.

Example 14 includes the system of any of Examples 12-13, wherein the at least one processor is configured to: determine, for at least one corresponding epoch pair, that a first type of processing used to generate a final position solution of a first epoch in the at least one corresponding epoch pair is equivalent to a second type of processing used to generate a final position solution for a second epoch in the at least one corresponding epoch pair; compare whether a first set of integer ambiguities associated with the final position solution of the first epoch are equal to a second set of integer ambiguities associated with the final position solution of the second epoch; and generate a combined position solution for the at least one corresponding epoch pair, wherein the generated combined position solution for the at least one corresponding epoch pair is based on whether the first set of integer ambiguities and the second set of integer ambiguities are equal.

Example 15 includes the system of Example 14, wherein the at least one processor is configured to: determine that the first set of integer ambiguities and the second set of integer ambiguities are equal; determine whether the final position solution of the first epoch and the final position solution of the second epoch pass a consistency check; and wherein the generated combined position solution is based on whether the final position solution of the first epoch and the final position solution of the second epoch pass the consistency check.

Example 16 includes the system of Example 15, wherein the at least one processor is configured to: determine either (1) that the first set of integer ambiguities and the second set of integer ambiguities are not equal, and/or (2) that the final position solution of the first epoch and the final position solution of the second epoch do not pass the consistency check; determine whether an amount of equal ambiguities between the first set of integer ambiguities and the second set of integer ambiguities exceed a threshold value; and wherein the generated combined position solution is based on whether the amount of equal ambiguities between the first set of integer ambiguities and the second set of integer ambiguities exceeds the threshold value.

Example 17 includes the system of Example 16, wherein the at least one processor is configured to: determine that the amount of equal ambiguities between the first set of integer ambiguities and the second set of integer ambiguities exceeds the threshold value; and generate the combined position solution for the at least one corresponding epoch pair based on GNSS data associated with satellites that are common to the equal ambiguities between the first set of integer ambiguities and the second set of integer ambiguities.

Example 18 includes the system of any of Examples 16-17, wherein the at least one processor is configured to: determine that the amount of equal ambiguities between the first set of integer ambiguities and the second set of integer ambiguities does not exceed the threshold value; in response to determining that the amount of equal ambiguities does not exceed the threshold value; then compare a position solution generated by a lower-priority type of processing than the first type of processing of the first epoch of the at least one corresponding epoch pair with a position solution generated by a lower-priority type of processing than the second type of processing of the second epoch of the at least one corresponding epoch pair.

Example 19 includes a program product comprising a non-transitory processor-readable medium on which program instructions configured to be executed by at least one processor are embodied, wherein when executed by the at least one processor, the program instructions cause the at least one processor to: receive GNSS data corresponding to a vehicle, the GNSS data including, for each of a plurality of epochs, pseudorange measurements, carrier phase measurements, and satellite positions for a plurality of satellites; generate a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing; generate, for each corresponding epoch pair between the forward position solution and the backward position solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and generate a post-processed GNSS solution including the combined position solution generated for each corresponding epoch pair.

Example 20 includes the program product of Example 19, wherein to generate the combined position solution comprises calculating a weighted average of a position solution of a first epoch of at least one corresponding epoch pair and a position solution of a second epoch of the at least one corresponding epoch pair.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
receiving GNSS data corresponding to a vehicle, the GNSS data including, for each of a plurality of epochs, pseudorange measurements, carrier phase measurements, and satellite positions for a plurality of satellites;
generating a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing;
generating, for each epoch pair including the forward position (FP) solution and the corresponding backward position (BP) solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and
generating a post-processed GNSS solution including the combined position solution generated for each corresponding epoch pair.

2. The method of claim 1, wherein the types of processing are prioritized such that a position generated from a L1 fixed ambiguity positioning processing is given a highest priority for a respective epoch and a SPP processing is given a lowest priority for the respective epoch; and further comprising:
determining, for at least one corresponding epoch pair, that a first type of processing used to generate a final position solution of a first epoch in the at least one corresponding epoch pair is higher in priority than a second type of processing used to generate a final position solution for a second epoch in the at least one corresponding epoch pair; and
generating, for the at least one corresponding epoch pair, a combined position solution based on the first epoch associated with the first type of processing having the higher priority.

3. The method of claim 1, further comprising:
determining, for at least one corresponding epoch pair, that a first type of processing used to generate a final position solution of a first epoch in the at least one corresponding epoch pair is equivalent to a second type of processing used to generate a final position solution for a second epoch in the at least one corresponding epoch pair;
comparing whether a first set of integer ambiguities associated with the final position solution of the first epoch are equal to a second set of integer ambiguities associated with the final position solution of the second epoch; and
generating a combined position solution for the at least one corresponding epoch pair, wherein the generated combined position solution for the at least one corresponding epoch pair is based on whether the first set of integer ambiguities and the second set of integer ambiguities are equal.

4. The method of claim 3, further comprising:
determining that the first set of integer ambiguities and the second set of integer ambiguities are equal;
determining whether the final position solution of the first epoch and the final position solution of the second epoch pass a consistency check; and
wherein the generated combined position solution is based on whether the final position solution of the first epoch and the final position solution of the second epoch pass the consistency check.

5. The method of claim 4, further comprising:
determining either (1) that the first set of integer ambiguities and the second set of integer ambiguities are not equal, and/or (2) that the final position solution of the first epoch and the final position solution of the second epoch do not pass the consistency check;
determining whether an amount of equal ambiguities between the first set of integer ambiguities and the second set of integer ambiguities exceed a threshold value; and
wherein the generated combined position solution is based on whether the amount of equal ambiguities between the first set of integer ambiguities and the second set of integer ambiguities exceeds the threshold value.

6. The method of claim 5, further comprising:
determining that the amount of equal ambiguities between the first set of integer ambiguities and the second set of integer ambiguities exceeds the threshold value; and
generating the combined position solution for the at least one corresponding epoch pair based on GNSS data associated with satellites that are common to the equal ambiguities between the first set of integer ambiguities and the second set of integer ambiguities.

7. The method of claim 5, further comprising:
determining that the amount of equal ambiguities between the first set of integer ambiguities and the second set of integer ambiguities does not exceed the threshold value;
in response to determining that the amount of equal ambiguities does not exceed the threshold value; then comparing a position solution generated by a lower-priority type of processing than the first type of processing of the first epoch of the at least one corresponding epoch pair with a position solution generated by a lower-priority type of processing than the second type of processing of the second epoch of the at least one corresponding epoch pair.

8. The method of claim 7, wherein the first type of processing is the L1 fixed ambiguity positioning processing, wherein the lower-priority type of processing is the WL fixed ambiguity positioning processing.

9. The method of claim 1, further comprising:
determining that a position solution generated from L1 fixed ambiguity positioning processing and a position solution generated from WL fixed positioning processing are not valid for a first epoch of at least one corresponding epoch pair;
determining that a position solution generated from L1 fixed ambiguity positioning processing and a position solution generated from WL fixed positioning processing are not valid for a second epoch of the at least one corresponding epoch pair;
determining that at least one position solution generated from CSCD processing is valid for at least one of: the first epoch or the second epoch; and
generating a combined position solution for the at least one corresponding epoch pair based on the at least one position solution generated from CSCD processing.

10. The method of claim 1, further comprising:
determining that a position solution generated from L1 fixed ambiguity positioning processing, WL fixed ambiguity positioning processing, and a position solution generated from CSCD processing are not valid for a first epoch of at least one corresponding epoch pair;
determining that a position solution generated from L1 fixed ambiguity positioning processing, WL fixed ambiguity positioning processing, and a position solution generated from CSCD processing are not valid for a second epoch of the at least one corresponding epoch pair;
determining that at least one position solution generated from SPP processing is valid for at least one of: the first epoch or the second epoch; and
generating a combined position solution for the at least one corresponding epoch pair based on the at least one position solution generated from SPP processing.

11. The method of claim 1, wherein generating the combined position solution comprises calculating a weighted average of a position solution of a first epoch of at least one corresponding epoch pair and a position solution of a second epoch of the at least one corresponding epoch pair.

12. A system, comprising:
at least one Global Navigation Satellite Systems (GNSS) receiver, wherein the at least one GNSS receiver is configured to generate GNSS data, the GNSS data including, for each of a plurality of epochs, pseudorange measurements, carrier phase measurements, and satellite positions for a plurality of satellites;
at least one processor communicatively coupled to the at least one GNSS receiver;
a storage medium coupled to the at least one processor and comprising a GNSS post-processing application, wherein by executing the GNSS post-processing application, the at least one processor is configured to:
generate a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing;
generate, for each epoch pair including the forward position (FP) solution and the corresponding backward position (BP) solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and
generate a post-processed GNSS solution including the combined position solution generated for each corresponding epoch pair.

13. The system of claim 12, wherein the types of processing are prioritized such that a position generated from a L1 fixed ambiguity positioning processing is given a highest priority for a respective epoch and a SPP processing is given a lowest priority for the respective epoch; wherein the at least one processor is configured to:
determine, for at least one corresponding epoch pair, that a first type of processing used to generate a final position solution of a first epoch in the at least one corresponding epoch pair is higher in priority than a second type of processing used to generate a final position solution for a second epoch in the at least one corresponding epoch pair; and
generate, for the at least one corresponding epoch pair, a combined position solution based on the first epoch associated with the first type of processing having the higher priority.

14. The system of claim 12, wherein the at least one processor is configured to:
determine, for at least one corresponding epoch pair, that a first type of processing used to generate a final position solution of a first epoch in the at least one corresponding epoch pair is equivalent to a second type of processing used to generate a final position solution for a second epoch in the at least one corresponding epoch pair;
compare whether a first set of integer ambiguities associated with the final position solution of the first epoch are equal to a second set of integer ambiguities associated with the final position solution of the second epoch; and generate a combined position solution for the at least one corresponding epoch pair, wherein the generated combined position solution for the at least one corresponding epoch pair is based on whether the first set of integer ambiguities and the second set of integer ambiguities are equal.

15. The system of claim 14, wherein the at least one processor is configured to:
determine that the first set of integer ambiguities and the second set of integer ambiguities are equal;
determine whether the final position solution of the first epoch and the final position solution of the second epoch pass a consistency check; and
wherein the generated combined position solution is based on whether the final position solution of the first epoch and the final position solution of the second epoch pass the consistency check.

16. The system of claim 15, wherein the at least one processor is configured to:
determine either (1) that the first set of integer ambiguities and the second set of integer ambiguities are not equal, and/or (2) that the final position solution of the first epoch and the final position solution of the second epoch do not pass the consistency check;
determine whether an amount of equal ambiguities between the first set of integer ambiguities and the second set of integer ambiguities exceed a threshold value; and
wherein the generated combined position solution is based on whether the amount of equal ambiguities between the first set of integer ambiguities and the second set of integer ambiguities exceeds the threshold value.

17. The system of claim 16, wherein the at least one processor is configured to:
determine that the amount of equal ambiguities between the first set of integer ambiguities and the second set of integer ambiguities exceeds the threshold value; and
generate the combined position solution for the at least one corresponding epoch pair based on GNSS data associated with satellites that are common to the equal ambiguities between the first set of integer ambiguities and the second set of integer ambiguities.

18. The system of claim 16, wherein the at least one processor is configured to:
determine that the amount of equal ambiguities between the first set of integer ambiguities and the second set of integer ambiguities does not exceed the threshold value;
in response to determining that the amount of equal ambiguities does not exceed the threshold value; then compare a position solution generated by a lower-priority type of processing than the first type of processing of the first epoch of the at least one corresponding epoch pair with a position solution generated by a lower-priority type of processing than the second type of processing of the second epoch of the at least one corresponding epoch pair.

19. A program product comprising a non-transitory processor-readable medium on which program instructions configured to be executed by at least one processor are embodied, wherein when executed by the at least one processor, the program instructions cause the at least one processor to:
receive GNSS data corresponding to a vehicle, the GNSS data including, for each of a plurality of epochs, pseudorange measurements, carrier phase measurements, and satellite positions for a plurality of satellites;

generate a forward position solution and a backward position solution from the GNSS data, wherein the forward position solution and the backward position solution are generated based on, for each of the plurality of epochs, a combination of the following types of processing: (1) single point positioning (SPP) processing, (2) carrier smoothed code differential (CSCD) processing, (3) wide lane (WL) fixed ambiguity positioning processing, and (4) L1 fixed ambiguity positioning processing;

generate, for each epoch pair including the forward position (FP) solution and the corresponding backward position (BP) solution, a combined position solution based on a comparison of: (i) integer ambiguity values of a respective position generated for both epochs of the corresponding epoch pair, and (ii) the type of processing used to generate the respective position generated for both epochs of the corresponding epoch pair; and generate a post-processed GNSS solution including the combined position solution generated for each corresponding epoch pair.

20. The program product of claim 19, wherein to generate the combined position solution comprises calculating a weighted average of a position solution of a first epoch of at least one corresponding epoch pair and a position solution of a second epoch of the at least one corresponding epoch pair.

* * * * *